United States Patent
Zhan

(10) Patent No.: US 9,955,475 B2
(45) Date of Patent: Apr. 24, 2018

(54) METHOD, MANAGEMENT METHOD AND SYSTEM FOR PERFORMING CELL COMBINATION ON A PLURALITY OF SMALL CELLS

(71) Applicant: ZTE Corporation, Shenzhen, Guangdong (CN)

(72) Inventor: Jianming Zhan, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 168 days.

(21) Appl. No.: 14/648,943

(22) PCT Filed: Aug. 21, 2013

(86) PCT No.: PCT/CN2013/081976
§ 371 (c)(1),
(2) Date: Jul. 7, 2015

(87) PCT Pub. No.: WO2013/189402
PCT Pub. Date: Dec. 27, 2013

(65) Prior Publication Data
US 2015/0319755 A1    Nov. 5, 2015

(30) Foreign Application Priority Data
Dec. 7, 2012    (CN) .......................... 2012 1 0523926

(51) Int. Cl.
*H04W 84/04*    (2009.01)
*H04W 72/04*    (2009.01)
(Continued)

(52) U.S. Cl.
CPC ....... *H04W 72/0426* (2013.01); *H04L 5/0069* (2013.01); *H04W 16/18* (2013.01);
(Continued)

(58) Field of Classification Search
None
See application file for complete search history.

(56) References Cited

U.S. PATENT DOCUMENTS

| 2005/0243896 | A1 | 11/2005 | Yuan |
| 2008/0075119 | A1* | 3/2008 | Zhang ................... H04L 5/0007 370/503 |
| 2010/0210273 | A1* | 8/2010 | Jun ........................ H04W 24/02 455/450 |

FOREIGN PATENT DOCUMENTS

| CN | 1694374 A | 11/2005 |
| CN | 1700624 A | 11/2005 |

(Continued)

OTHER PUBLICATIONS

Young-Ho Jung and Yong H. Lee, Scrambling Code Planning for 3GPP W-CDMA Systems, 2001 IEEE.*

(Continued)

*Primary Examiner* — Hassan Phillips
*Assistant Examiner* — Ayanah George
(74) *Attorney, Agent, or Firm* — Oppedahl Patent Law Firm LLC

(57) ABSTRACT

A method, management method and system for performing cell combination on a plurality of small cells are provided. In the combination method, a signal node (SN) receives position information sent from each small cell connected to the SN, and groups the small cells under a preset algorithm according to the received position information, such that small cells in a same group share a local cell serial number; a radio network connector (RNC) acquires all of the local cell serial numbers from the SN and maps each of the local cell serial numbers to a respective logical cell serial number.

10 Claims, 6 Drawing Sheets

(51) Int. Cl.
- *H04W 84/02* (2009.01)
- *H04L 5/00* (2006.01)
- *H04W 40/04* (2009.01)
- *H04W 56/00* (2009.01)
- *H04W 16/18* (2009.01)
- *H04W 24/02* (2009.01)
- *H04W 88/08* (2009.01)

(52) U.S. Cl.
CPC .......... *H04W 24/02* (2013.01); *H04W 40/04* (2013.01); *H04W 56/001* (2013.01); *H04W 84/02* (2013.01); *H04W 84/045* (2013.01); *H04W 88/08* (2013.01)

(56) References Cited

FOREIGN PATENT DOCUMENTS

| | | |
|---|---|---|
| CN | 101400111 A | 4/2009 |
| CN | 101420703 A | 4/2009 |
| CN | 101594679 A | 12/2009 |
| CN | 102186265 A | 9/2011 |
| CN | 102340783 A | 2/2012 |
| CN | 202160286 U | 3/2012 |
| EP | 1775968 A1 | 4/2007 |
| EP | 2079263 A1 | 7/2009 |
| WO | 2010105665 A1 | 9/2010 |
| WO | 2012108803 A1 | 8/2012 |

OTHER PUBLICATIONS

Partial Supplementary European Search Report in European application No. 13807031.3, dated Dec. 18, 2015.
Scrambling Code Planning for 3GPP W-CDMA Systems, mailed on May 6, 2001.
Supplementary European Search Report in European application No. 13807031.3, dated Apr. 8, 2016.
International Search Report in international application No. PCT/CN2013/081976, dated Nov. 28, 2013.
English Translation of the Written Opinion of the International Search Authority in international application No. PCT/CN2013/081976, dated Nov. 28, 2013.
Technology Conference, 2001. VTC 2001 Spring. IEEE VTS 53rd, "Scrambling code planning for 3GPP W-CDMA systems" p. 2431-2433, Young-Ho Jung, Y.H. Lee, Aug. 7, 2002.
Telecommunication engineering technology and standardization, "Cell Conbination Technology and Application of TD-SCDMA Network", Shi Hao, 9 phase of 2010.
Designing Techniques of Posts and Telecommunications, "indoor and outdoor co-coverage in 3G", Wang-youwei, 11 phase of 2009.
Designing Techniques of Posts and Telecommunications, "Research on TD-SCDMA High-speed Railway Coverage Solution", Sui Yan-feng, 6 phase of 2010.
Journal of Electronics & Information Technology, "A Code-reuse Scheme in the Downlink of TD-SCDMA System", Liao Yan-yan, 12 phase of 2007.
Beijing University of Posts and Telecommunications, "The wcdma optimization with CC technology" Zhu guojun, Apr. 30, 2011.

\* cited by examiner

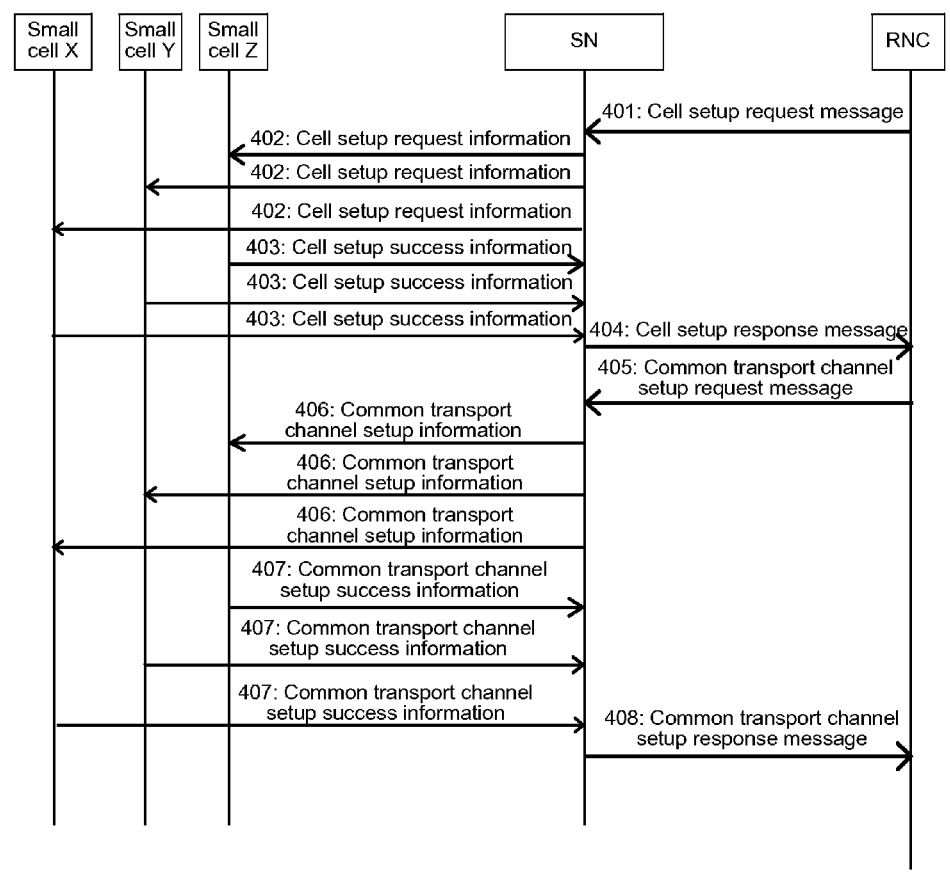

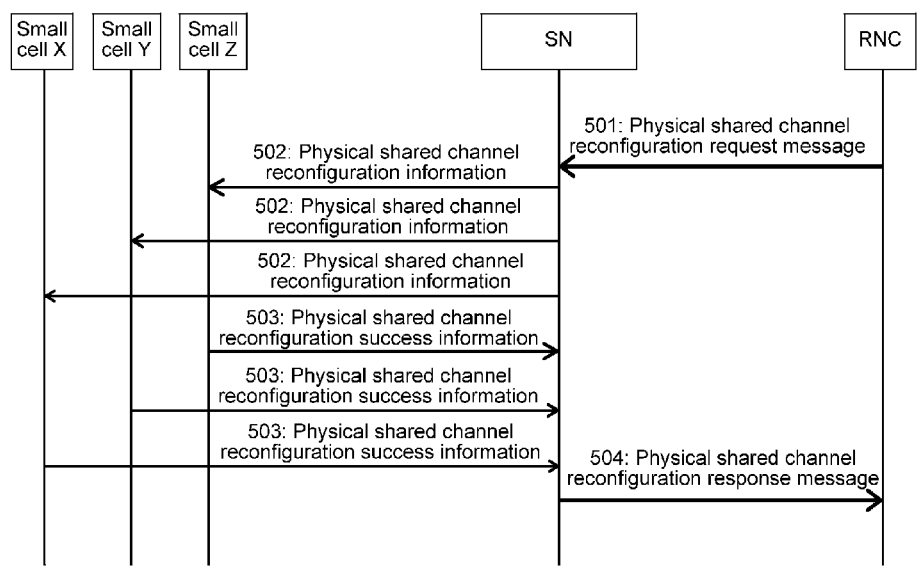

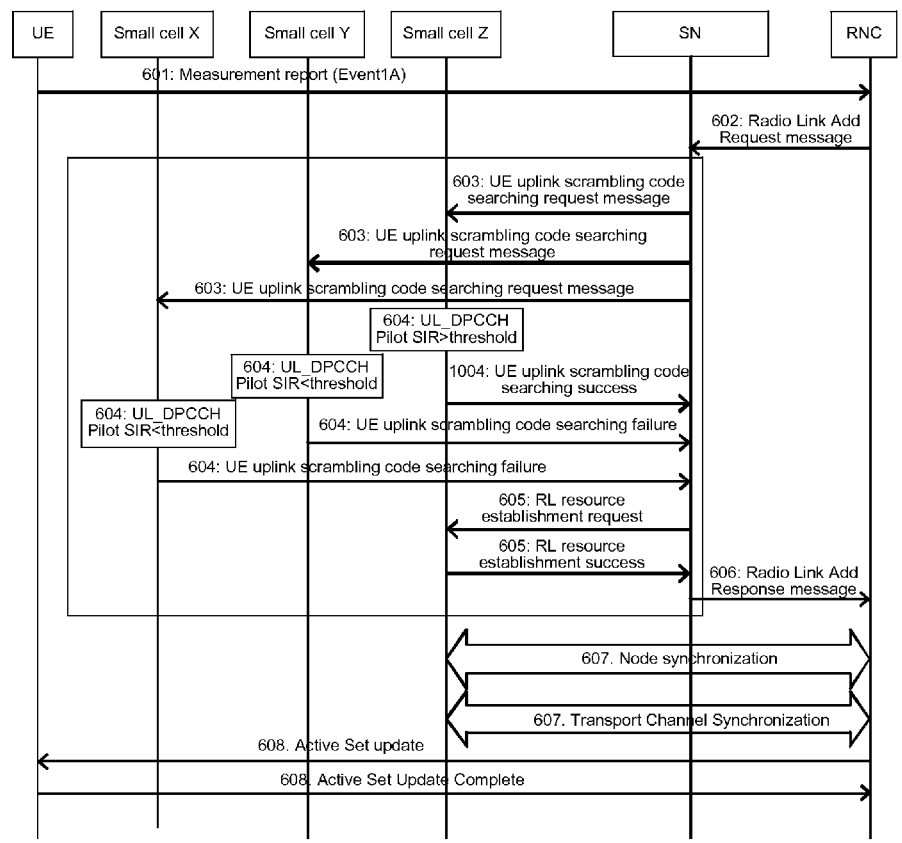

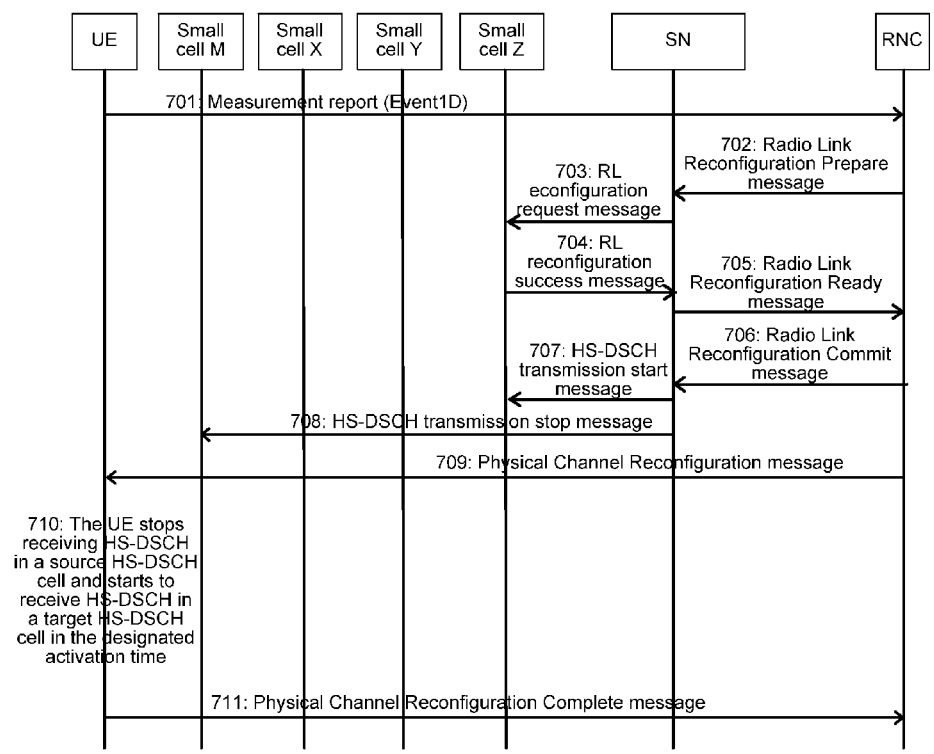

METHOD, MANAGEMENT METHOD AND SYSTEM FOR PERFORMING CELL COMBINATION ON A PLURALITY OF SMALL CELLS

TECHNICAL FIELD

The present disclosure relates to the universal mobile telecommunications system (UMTS) wireless access technology, and in particular to a method, management method and system for performing cell combination on a plurality of small cells.

BACKGROUND

A UMTS wireless access system contains two main network elements: a radio network controller (RNC) and a Node B The RNC and the Node B communicate with each other using an Iub interface. In view of general network establishment mode, the main coverage is implemented in one of following manners: an RNC and an integrated macro cell with multiple sectors, or a RNC together with a distributed base station indoor building baseband unit (BBU) and a macro radio remote unit (RRU). In addition, there are a few femto cells for blind area compensation or hotspot coverage. In conclusion, entire network coverage is implemented by a combination of macro cells and a few femto cells.

With the rapid development of the mobile broadband services in recent years, the enormous applications of data services of various user equipments (UEs) in 3rd generation partnership project (3GPP) mode, such as cell phone, data card, tablet PC, directly lead to an explosive increase of data traffic in hotspot areas (various indoor and outdoor scenes). The data traffic requirement cannot be meet only by improving performance of traditional macro cells. Thus, at present, the dramatically increasing requirement for data traffic is met by using small cells. In terms of power, small cells are classified into micro cell adapted to a power of 2×5 w to 2×10 W, metro cell adapted to a power of 2×1 w, pico cell adapted to a power of 2×250 mw.

Small cells may be applied to outdoor hotspot or hot zone coverage, indoor hotspot or deep hot zone coverage, of which the number would be large, and several times and even tens times with respect to the number of macro cells. The number of metro cells and pico cells with small power is particularly large. If a wide deployment of small cells is still realized in traditional small cell form, the following problems will arise:

1. Each deployment of a small cell requires an engineer to configure a small cell connection on the RNC side, making the network deployment time-consuming and laborious.

2. The continuous increase in capacity of an existing RNC with the increase of deployed small cells makes the cost increased and is disadvantageous to the maintenance and management.

3. The RNC is required to allocate cell resources and processing capability to a small cell, just like those required to be done for a macro cell, though the cell capacity of a small cell is small. For example, for a base station with three sectors each having four carriers, each cell may contain 64 to 96 HSPA+ users on average, and each sector with four carriers contains 256 to 384 (=4*64 to 4*96) HSPA+ users in total, whereas, each cell of a small cell only has 16 to 32 HSPA+ users. In terms of the capacity concerning the number of users, the capacity of a macro cell is 2 to 6 times higher than the capacity of a femto cell.

4. The mobility between small cells leads to the generation of a large number of soft handover signalling on the Iub interface. Furthermore, since small cells and macro cells are logically connected to different RNCs, the handover of a UE between a small cell and a macro cell requires a cross-RNC Iub soft handover signalling, excessive signalling interactions increase the resource consumption and a long handover delay leads to a high call drop rate.

SUMMARY

For this purpose, the embodiments of the present disclosure a method, management method and system for performing cell combination on a plurality of small cells, which not only simplify network deployment and reduce cost, but also improve the utilization of RNC.

To achieve above-mentioned purpose, the technical schema of the embodiments of the present disclosure is implemented as following:

An embodiment of the disclosure proposes a method for performing cell combination on a plurality of small cells, including:

a signal node B (SN) receives position information sent from each small cell connected to the SN, and groups the small cells under a preset algorithm according to the received position information, such that small cells in a same group share a local cell serial number;

a RNC acquires all of the local cell serial numbers from the SN and maps each of the local cell serial numbers to a respective logical cell serial number.

Preferably, the reception of position information sent from each small cell connected to the SN by the SN includes:

the SN receives the position information sent from each small cell connected to the SN in one of the following transmission modes: wireless microwave, wireless local area network (WLAN) or wired Ethernet.

Preferably, the grouping of the small cells under a preset algorithm according to the received position information, such that small cells in a same group share a local cell serial number comprises:

the small cells are grouped under the preset algorithm according to the received position information, such that small cells in the same group share the local cell serial number, and are isolated with each other in terms of space coverage.

Preferably, the grouping of the small cells under a preset algorithm according to the received position information, such that small cells in a same group share a local cell serial number includes:

a distance D between any two small cells is calculated according to the received position information, and when D ≤ 2R+Δ, the two small cells are assigned with different local cell serial numbers;

when D>2R+Δ, the two small cells are assigned with a same local cell serial number, wherein Δ is an adjustment parameter, Δ∈[0,R], R is a maximum coverage radius value of a single small cell.

Preferably, the acquisition of all local cell serial numbers from the SN from the RNC includes:

the RNC acquires all local cell serial numbers from the SN through an audit procedure.

Preferably, the mapping of each of the local cell serial numbers to a respective logical cell serial number includes:

each of the local cell serial numbers is mapped to a respective logical cell serial number through a cell setup procedure, to form one-to-many mappings of the logical cell serial numbers to the local cell serial numbers.

An embodiment of the disclosure proposes a method for managing a Node-B Application Part (NBAP) procedure, the NBAP procedure including a common procedure and a dedicated procedure;

for the common procedure, except for a common procedure for radio link setup, the method includes: a SN sends same information to all of the small cells in a same logical cell according to a request message sent from a RNC; the SN feeds back a response message of the corresponding common procedure to the RNC after receiving success information fed back from all of the small cells in the same logical cell;

for the dedicated procedure and the common procedure for radio link setup, the method comprising: a SN sends uplink scrambling code information of a UE sent from a RNC to all of the small cells in a same logical cell in present procedure; each small cell searches according to a uplink scrambling code and a slot format of the UE, and feeds back a search result to the SN; the SN feeds back related configuration parameter information of corresponding dedicated procedure or common procedure for radio link setup to small cells which have fed back a success information of UE uplink scrambling code searching, and feeds back a response message of the corresponding dedicated procedure or common procedure for radio link setup to the RNC.

An embodiment of the disclosure proposes a system for performing cell combination on a plurality of small cells, including:

a signal node (SN), configured to receive position information sent from each small cell connected to the SN, and to group the small cells under a preset algorithm according to the received position information, such that small cells in a same group share a local cell serial number;

a radio network controller (RNC), configured to acquire all of the local cell serial numbers from the SN, and to map each of the local cell serial numbers to a respective logical cell serial number.

Preferably, the SN is specifically configured to receive the position information sent from each small cell connected to the SN in one of the following transmission modes: wireless microwave, WLAN or wired Ethernet.

Preferably, the SN is specifically configured group the small cells under the preset algorithm according to the received position information, such that the small cells in the same group share the local cell serial number, and are isolated with each other in terms of space coverage.

Preferably, the SN is specifically configured to calculate a distance D between any two small cells according to the received position information, and when $D \leq 2R+\Delta$, the two small cells are assigned with different local cell serial numbers, where $\Delta \in [0,R]$, R is a maximum coverage radius value of a single small cell;

when $D>2R+\Delta$, assigning the two small cells with a same local cell serial number, where $\Delta$ is an adjustment parameter, $\Delta \in [0,R]$, R is a maximum coverage radius value of a single small cell.

Preferably, the RNC is specifically configured to acquire all local cell serial numbers from the SN through an audit procedure.

Preferably, the RNC is specifically configured to map each of the local cell serial numbers to a respective logical cell serial number through a cell setup procedure, to form one-to-many mappings of the logical cell serial numbers to the local cell serial numbers.

From the foregoing, the technical schema in the embodiments of the present disclosure includes: an SN receives position information sent from each small cell connected to the SN, and groups the small cells under a preset algorithm according to the received position information, such that small cells in a same group share a local cell serial number; a RNC acquires all of the local cell serial numbers from the SN and maps each of the local cell serial numbers to a respective logical cell serial number. Therefore, with the combination of small cells, the embodiments of the present disclosure not only simplify network deployment and reduce cost, but also improve the utilization of RNC.

BRIEF DESCRIPTION OF THE DRAWINGS

FIG. 4 is a flow chart of a cell setup procedure and an common transport channel setup procedure of NBAP according to an embodiment of the disclosure.

FIG. 5 is a flow chart of a redistribution procedure of physical shared channel of NBAP according to an embodiment of the disclosure.

FIG. 6 is a flow chart of an R99 soft handover procedure during a mobility procedure of a UE in small cells according to an embodiment of the disclosure.

FIG. 7 is a flow chart of a co-frequency HS-DSCH change procedure during a mobility procedure of a UE in small cells according to an embodiment of the disclosure.

DETAILED DESCRIPTION

Figure 1:
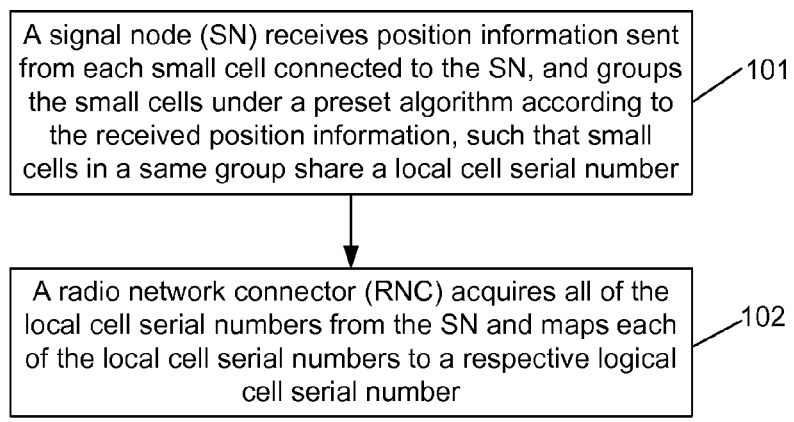
FIG. 1 is a flow chart of an embodiment of the method for performing cell combination on a plurality of small cells according to the disclosure.

As shown in FIG. 1, an embodiment of the present disclosure provides a method for performing cell combination on a plurality of small cells, including:

Step 101: an SN receives position information sent from each small cell connected to the SN, and groups the small cells under a preset algorithm according to the received position information, such that small cells in a same group share a local cell serial number;

Step 102: an RNC acquires all of the local cell serial numbers from the SN and maps each of the local cell serial numbers to a respective logical cell serial number.

Preferably, the reception of position information sent from each small cell connected to the SN by the SN includes:

the SN receives position information sent from each small cell connected to the SN in one of the following transmission modes: wireless microwave, WLAN or wired Ethernet.

Preferably, the grouping of the small cells under a preset algorithm according to the received position information, such that small cells in a same group share a local cell serial number comprises:

the small cells are grouped under the preset algorithm according to the received position information, such that small cells in the same group share the local cell serial number, and are isolated with each other in terms of space coverage;

in this way, multiple isolated small cells may be taken as a logical cell, and non-adjacent small cells in a logical cell use a same pilot frequency, downlink scrambling code and downlink code channel resources, which increases the wireless air interface capacity of the same logical cell by N times, where N is the number of small cells in the same logical cell.

Preferably, the grouping of the small cells under a preset algorithm according to the received position information, such that small cells in a same group share a local cell serial number includes:

a distance D between any two small cells is calculated according to the received position information, when $D \leqslant 2R+\Delta$, the two small cells are assigned with different local cell serial numbers, where $\Delta \epsilon [0,R]$, R is a maximum coverage radius value of a single small cell;

when $D>2R+\Delta$, the two small cells are assigned with a same local cell serial number, wherein $\Delta$ is an adjustment parameter, $\Delta \epsilon [0,R]$, R is a maximum coverage radius value of a single small cell.

Preferably, the acquisition of all local cell serial numbers from the SN by the RNC includes: the RNC acquires all local cell serial numbers from the SN through an Iub interface audit procedure.

Preferably, the mapping of each of the local cell serial numbers to a respective logical cell serial number includes: each of the local cell serial numbers is mapped to a respective logical cell serial number through an Iub interface cell setup procedure, to form one-to-many mappings of the logical cell serial numbers to the local cell serial numbers.

An embodiment of the present disclosure provides a method for managing an NBAP procedure, the NBAP procedure including a common procedure and a dedicated procedure;

for the common procedure, except for a common procedure for radio link setup, the method includes: a SN sends same information to all of the small cells in a same logical cell according to a request message sent from an RNC; the SN feeds back a corresponding response message of the common procedure to the RNC after receiving success information fed back from all of the small cells in the same logical cell;

for the dedicated procedure and the common procedure for radio link setup, the method includes: a SN receives uplink scrambling code information of a UE sent from a RNC to all of the small cells in a same logical cell in present procedure; each small cell searches according to a uplink scrambling code and a slot format of the UE, and feeds back a search result to the SN; the SN feeds back corresponding related configuration parameter information of the procedure to small cells which have fed back a success message of UE uplink scrambling code searching, and feeds back a corresponding response message of the dedicated procedure or common procedure for radio link setup to the RNC.

Figure 2:
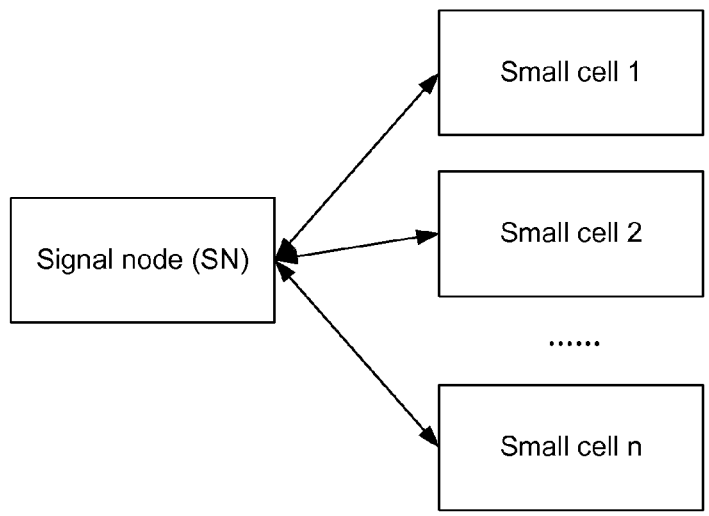
FIG. 2 is a structural diagram of an embodiment of the system for performing cell combination on a plurality of small cells according to the disclosure.
Figure 3:
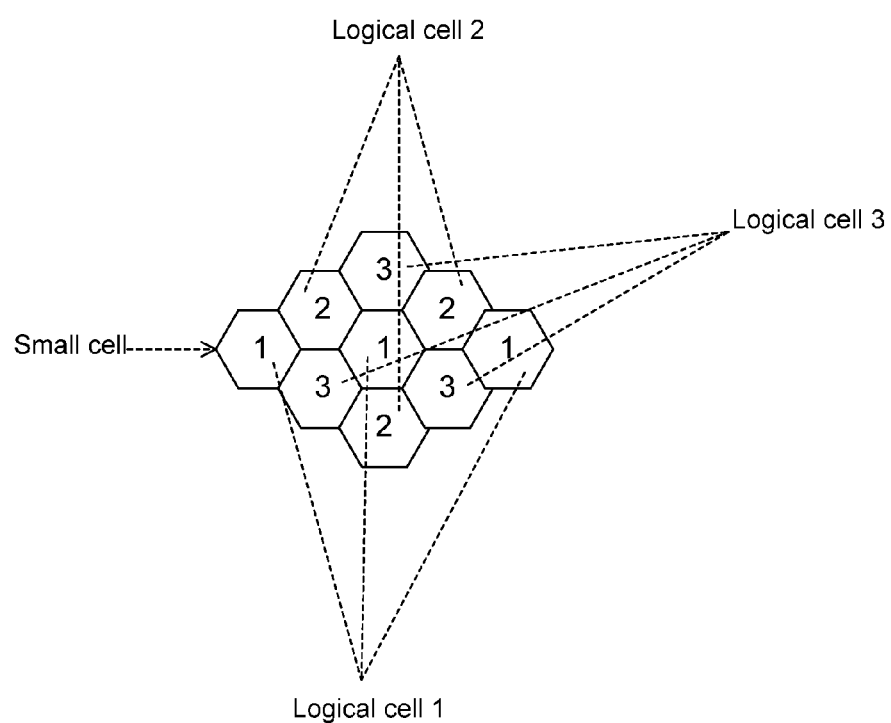
FIG. 3 is a structural diagram of logical cell according to an embodiment of the disclosure.

As shown in FIG. 2, an embodiment of the present disclosure provides a system for performing cell combination on a plurality of small cells, including:

an SN, configured to receive position information sent from each small cell connected to the SN, and to group the small cells under a preset algorithm according to the received position information, such that small cells in a same group share a local cell serial number;

an RNC, configured to acquire all of the local cell serial numbers from the SN, and to map each of the local cell serial numbers to a respective logical cell serial number. The structure of a logical cell is shown in FIG. 3.

Preferably, the SN is specifically configured to receive the position information sent from each small cell connected to the SN in one of the following transmission modes: wireless microwave, WLAN or wired Ethernet.

The SN is specifically configured group the small cells under the preset algorithm according to the received position information, such that the small cells in the same group share the local cell serial number, and are isolated with each other in terms of space coverage.

Preferably, the SN is specifically configured to calculate a distance D between any two small cells according to the received position information; when $D \leqslant 2R+\Delta$, the two small cells are assigned with different local cell serial numbers, where $\Delta \epsilon [0,R]$, R is a maximum coverage radius value of a single small cell; when $D>2R+\Delta$, the two small cells are assigned with a same local cell serial number, wherein $\Delta$ is an adjustment parameter, $\Delta \epsilon [0,R]$, R is a maximum coverage radius value of a single small cell.

Preferably, the RNC is specifically configured to acquire all local cell serial numbers from the SN through an Iub interface audit procedure.

Preferably, the RNC is specifically configured to map each of the local cell serial numbers to a respective logical cell serial number through an Iub interface cell setup procedure, to form one-to-many mappings of the logical cell serial numbers to the local cell serial numbers.

NBAP common procedures include: cell step procedure, common transport channel setup procedure, physical shared channel reconfiguration procedure and radio link setup procedure. Except for radio link setup procedure, other common procedures include: an SN sends same information to all of the small cells in a same logical cell according to a request message sent from a RNC; the SN feeds back a corresponding response message of the common procedure to the RNC after receiving success information fed back from all of the small cells in the same logical cell.

The NBAP cell setup procedure and common transport channel setup procedure are discussed below with reference to FIG. 4. In FIG. 4, small cells X, Y and Z belong to a same logical cell, and a SN and the small cells X, Y and Z form a logical base station. Specifically, the cell setup procedure includes:

Step 401: a RNC sends a Cell Setup Request message to a SN;

Step 402: the SN sends cell setup information to all of the small cells in a same logical cell according to the Cell Setup Request message;

Step 403: each of the small cells in the same logical cell sends cell setup success information to the SN;

Step: the SN feeds back a Cell Setup Response message to the RNC after receiving the success information fed back from all of the small cells in the same logical cell.

The common transport channel setup procedure includes:

Step 405: the RNC sends a Common Transport Channel Setup Request message to the SN;

Step 406: the SN sends a common transport channel setup message to all of the small cells in the same logical cell according to the Common Transport Channel Setup Request message;

Step 407: each of the small cells in the same logical cell sends common transport channel setup success information to the NS;

Step 408: the SN feeds back a Common Transport Channel Setup Response message to the RNC after receiving the success information fed back from all of the small cells in the same logical cell.

A NBAP physical shared channel reconfiguration procedure after the common transport channel setup procedure is discussed below with reference to FIG. 5.

Step 501: a RNC sends a Physical Shared Channel Reconfiguration Request message to a SN;

Step 502: the SN sends physical shared channel reconfiguration information to all of the small cells in a small cells according to the Physical Shared Channel Reconfiguration Request message, all of the small cells in the same logical cell may be assigned with same code channels of high speed physical downlink shared channel (HS-PDSCH) and a same number of the code channels of the HS-PDSCH;

Step 503: all of the small cells in the same logical cell return physical shared channel reconfiguration success information to the SN respectively;

Step 504: the SN feeds back a Physical Shared Channel Reconfiguration Response message to the RNC after receiving the success information fed back from all of the small cells in the same logical cell.

The NBAP dedicated procedure and the common procedure for NBAP radio link setup include: a SN sends uplink scrambling code information of a UE sent from an RNC to all of the small cells in a same logical cell in present procedure; each small cell searches according to an uplink scrambling code and a slot format of the UE, and feeds back a search result to the SN; the SN feeds back corresponding related configuration parameter information of dedicated procedure or common procedure for radio link setup to small cells which have fed back a success message of UE uplink scrambling code searching, and feeds back a corresponding response message of the dedicated procedure or common procedure for radio link setup to the RNC.

The mobility procedure in small cells is discussed below with reference to FIGS. 6 and 7. In FIGS. 6 and 7, small cells X, Y and Z belong to a logical cell B, while small cell M belongs to a logical cell A. SN and small cells X, Y, Z, M form a logical base station, that is to say, from the view of an RNC, the small cells X, Y, Z and M form a base station, and the logical cell A and the logical cell B belong to the logical base station. In this example, a UE moves from a coverage area of the small cell M in the logical cell A to a coverage area of the small cell Z in the logical cell B. The procedure includes an intra-Node B based R99 soft handover procedure and a co-frequency cell high-speed downlink shared channel (HS-DSCH) cell alter procedure. Specifically, as shown in FIG. 6, the R99 soft handover procedure includes following steps:

Step 601: when a UE enters a coverage area of a small cell Z from a coverage area of a small cell M, the UE sends a measurement report Event1A to an RNC;

Step 602: the RNC which has received the Event1A sends a Radio Link Add Request message to the SN;

Step 603: the SN extracts a logical cell identification, an uplink scrambling code of an uplink dedicated physical channel (UL DPCH) and slot format information of an uplink dedicated physical control channel form the Radio Link Add Request message, determines serial numbers of all of the small cells in the logical cell according to the logical cell identification, and sends a UE uplink scrambling code searching request message, which carries UL DPCH uplink scrambling code and UL DPCCH slot format information, to all of the small cells in the same logical cell;

Step 604: all of the small cells search according to the UE scrambling code and the slot format in the UE uplink scrambling code searching request message; when the UL DPCH Pilot signal to interference ratio (SIR) is greater than a threshold, a small cell feeds back a UE uplink scrambling code searching success message to the SN; and when the UL DPCH Pilot SIR is less than the threshold, a small cell feeds back a UE uplink scrambling code searching failure message to the SN; in this example, the UL DPCH Pilot SIRs of small cells X, Y are less than the threshold and the UL DPCH Pilot SIR of small cell Z is greater than the threshold;

Step 605: the SN sends a radio link (RL) resource establishment request message to the small cell Z which has fed back the UE uplink scrambling code searching success message, and the small cell Z feeds back a RL resource establishment success message to the SN after the RL resource is established;

Step 606: the SN which has received the RL resource establishment success message sends a Radio Link Add Response message to the RNC;

Step 607: an Iub user plane node synchronization and transport channel synchronization procedure is carried out between the RNC and the small cell Z;

Step 608: the RNC sends an Active Set Update message to the UE and instructs the UE to add a logical cell to which the small cell Z belongs, the UE which has received the Active Set Update message feeds back an Active Set Update Complete message to the RNC.

As shown in FIG. 7, the co-frequency HS-DSCH cell alter procedure in an intra-Node B includes following steps:

Step 701: when a UE enters a coverage area of a small cell Z from a coverage area of a small cell M, the UE sends a measurement report Event1D to an RNC;

Step 702: the RNC which has received the Event1D sends a Radio Link Reconfiguration Prepare message to the SN;

Step 703: since the SN has acquired that a radio link to be reconfigured by the UE belongs to the small cell Z during an R99 soft handover procedure, the SN sends an RL reconfiguration request message to the small cell Z with which the UE is associated, the RL reconfiguration request message containing parameters of the Radio Link Reconfiguration Prepare message;

Step 704: the small cell Z feedbacks a RL reconfiguration success message to the SN;

Step 705: the SN which has received the RL reconfiguration success message sends a Radio Link Reconfiguration Ready message to the RNC;

Step 706: the RNC which has received the Radio Link Reconfiguration Ready message sends a Radio Link Reconfiguration Commit message to the SN;

Step 707: the SN which has received the Radio Link Reconfiguration Commit message sends a high speed downlink shared channel (HS-DSCH) transmission start message to the small cell Z, which contains activation time selected in the form of connect frame number (CFN);

Step 708: the SN which has received the Radio Link Reconfiguration Commit message sends a HS-DSCH transmission stop message to the small cell M, which contains deactivation time selected in the form of CFN, the deactivation time is equal to the activation time selected in the form of CFN contained in the HS-DSCH transmission start message;

Step 709: the RNC sends a Physical Channel Reconfiguration message to the UE which contains messages such as activation time;

Step 710: the UE stops receiving HS-DSCH in a source HS-DSCH cell (the cell to which the small cell M belongs) and starts to receive HS-DSCH in a target HS-DSCH cell (the cell to which the small cell Z belongs) in the designated activation time;

Step 711: the UE feeds back a Physical Channel Reconfiguration Complete message to the RNC.

The above descriptions are just preferred embodiments of the present disclosure, which are not used to limit the scope of the present disclosure.

The invention claimed is:

1. A method for performing cell combination on a plurality of small cells, comprising:
   receiving, by a signal node (SN), position information sent from each small cell connected to the SN, and grouping the small cells under a preset algorithm according to the received position information, such that small cells in a same group share a local cell serial number;
   acquiring, by a radio network controller (RNC), all of the local cell serial numbers from the SN, and mapping each of the local cell serial numbers to a respective logical cell serial number;
   wherein the grouping the small cells under a preset algorithm according to the received position information, such that small cells in a same group share a local cell serial number comprises:
   calculating a distance D between any two small cells according to the received position information, and when $D \leq 2R+\Delta$ assigning the two small cells with different local cell serial numbers; or
   when $D > 2R+\Delta$ assigning the two small cells with a same local cell serial number, wherein $\Delta$ is an adjustment parameter, $\Delta \in [0,R]$, R is a maximum coverage radius value of a single small cell.

2. The method according to claim 1, wherein the receiving, by an SN, position information sent from each small cell connected to the SN comprises:
   receiving, by the SN, position information sent from each small cell connected to the SN in one of the following transmission modes: wireless microwave, wireless local area network (WLAN) or wired Ethernet.

3. The method according to claim 1, wherein the grouping the small cells under a preset algorithm according to the received position information, such that small cells in a same group share a local cell serial number comprises:
   grouping the small cells under the preset algorithm according to the received position information, such that small cells in the same group share the local cell serial number, and are isolated with each other in terms of space coverage.

4. The method according to claim 1, wherein the acquiring all of the local cell serial numbers from the SN comprises:
   acquiring, by the RNC, all local cell serial numbers from the SN through an audit procedure.

5. The method according to claim 1, wherein the mapping each of the local cell serial numbers to a respective logical cell serial number comprises:
   mapping each of the local cell serial numbers to a respective logical cell serial number through a cell setup procedure, to form one-to-many mappings of the logical cell serial numbers to the local cell serial numbers.

6. A system for performing cell combination on a plurality of small cells, comprising:
   a signal node (SN), configured to receive position information sent from each small cell connected to the SN, and to group the small cells under a preset algorithm according to the received position information, such that small cells in a same group share a local cell serial number;
   a radio network controller (RNC), configured to acquire all of the local cell serial numbers from the SN, and to map each of the local cell serial numbers to a respective logical cell serial number;
   wherein the SN is configured to calculate a distance D between any two small cells according to the received position information, and when $D \leq 2R+\Delta$ the two small cells are assigned with different local cell serial numbers; or
   when $D > 2R+\Delta$ the two small cells are assigned with a same local cell serial number, wherein $\Delta$ is an adjustment parameter, $\Delta \in [0,R]$, R is a maximum coverage radius value of a single small cell.

7. The system according to claim 6, wherein the SN is configured to receive the position information sent from each small cell connected to the SN in one of the following transmission modes: wireless microwave, wireless local area network (WLAN) or wired Ethernet.

8. The system according to claim 6, wherein the SN is configured to group the small cells under the preset algorithm according to the received position information, such that the small cells in the same group share the local cell serial number, and are isolated with each other in terms of space coverage.

9. The system according to claim 6, wherein the RNC is configured to acquire all local cell serial numbers from the SN through an audit procedure.

10. The system according to claim 6, wherein the RNC is configured to map each of the local cell serial numbers to a respective logical cell serial number through a cell setup procedure, to form one-to-many mappings of the logical cell serial numbers to the local cell serial numbers.

* * * * *